June 12, 1923.
C. J. LUCE
COTTON BALE COMPRESSING DEVICE
Filed Oct. 18, 1922
1,458,584
5 Sheets-Sheet 1

Inventor
Charles J. Luce
By his Attorney

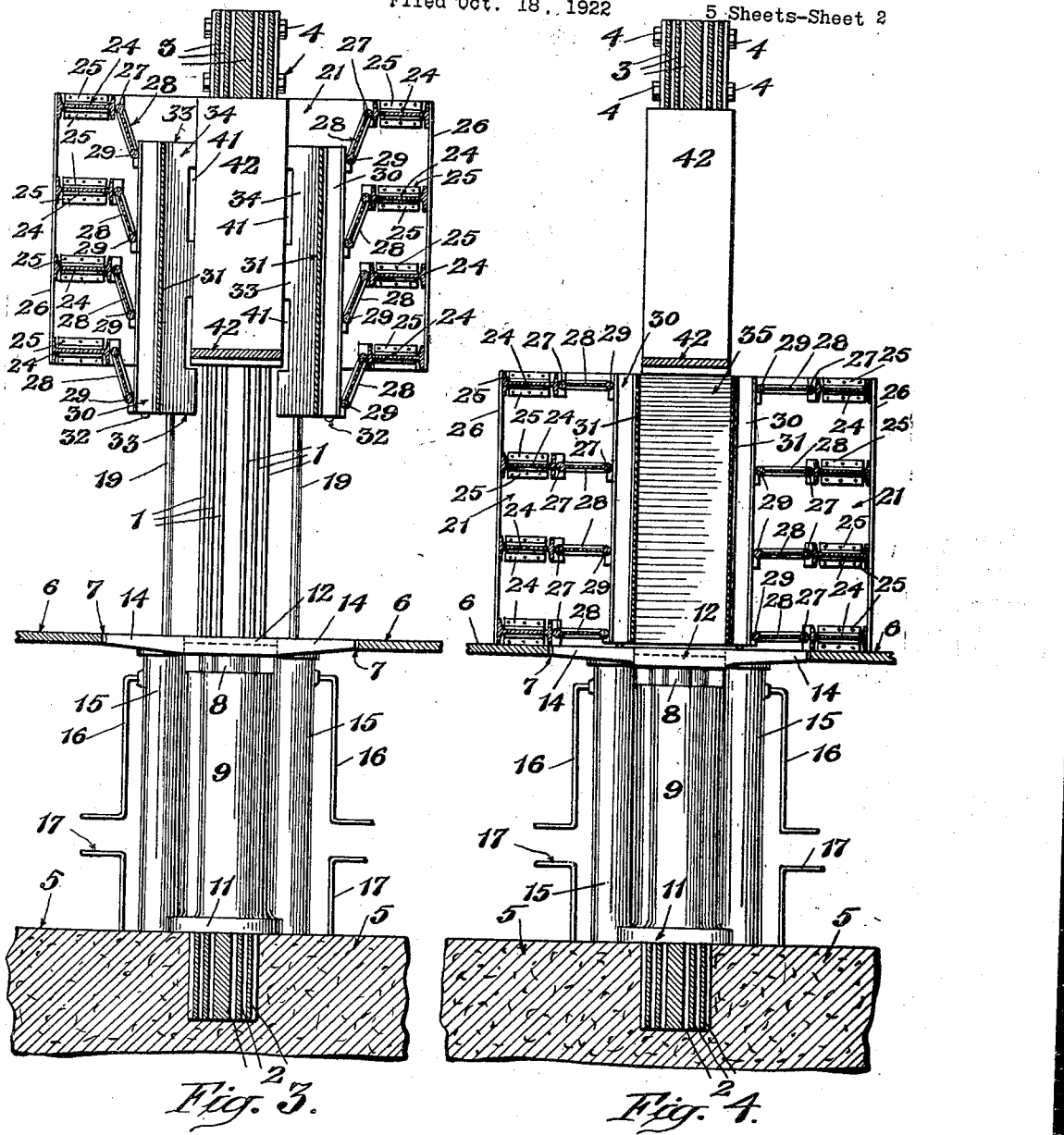

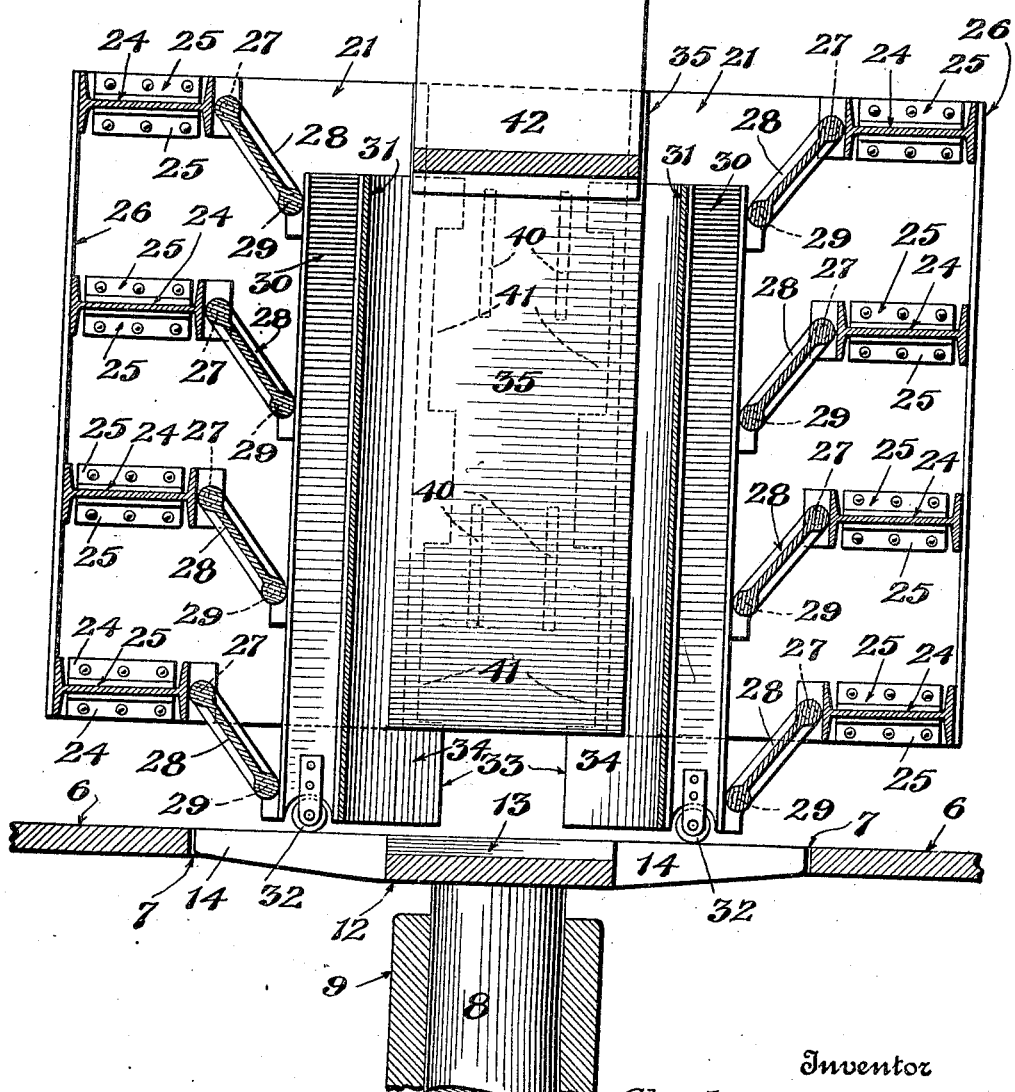

June 12, 1923.

C. J. LUCE 1,458,584

COTTON BALE COMPRESSING DEVICE

Filed Oct. 18, 1922

Inventor
Charles J. Luce
By his Attorney

June 12, 1923.

C. J. LUCE 1,458,584

COTTON BALE COMPRESSING DEVICE

Filed Oct. 18, 1922

Inventor
Charles J. Luce
By his Attorney

Patented June 12, 1923.

1,458,584

UNITED STATES PATENT OFFICE.

CHARLES J. LUCE, OF NIANTIC, CONNECTICUT, ASSIGNOR OF ONE-HALF TO EMLEN T. LITTELL, OF BAYHEAD, NEW JERSEY.

COTTON-BALE-COMPRESSING DEVICE.

Application filed October 18, 1922. Serial No. 595,252.

*To all whom it may concern:*

Be it known that I, CHARLES J. LUCE, a citizen of the United States, and a resident of Niantic, county of New London, and State of Connecticut, have invented a certain new and useful Improvement in Cotton-Bale-Compressing Devices, of which the following is a specification.

This invention relates to a device for compressing or compacting bales of cotton, and has for its object to provide a device or mechanism which will be comparatively simple in construction and operation, inexpensive to maintain and which will speedily compact the rough bales of cotton to the desired smaller sizes.

With these objects in view, I have devised the particular arrangement of parts hereinafter set forth and more particularly pointed out in the claims appended hereto.

Reference is to be had to the accompanying drawings, forming a part hereof, in which—

Figure 3 is a vertical sectional view of the device, showing the same in its open position;

Figure 4 is a vertical sectional view of the device, showing the parts in the position that they assume when the sides and ends of the cotton bale are being simultaneously compacted;

Figure 5 is a vertical sectional view of the compressing mechanism, showing the positions that the parts are in when they are about to begin the compressing action;

Throughout the various views of the drawings, similar reference characters designate similar parts.

Figures 1, 2:
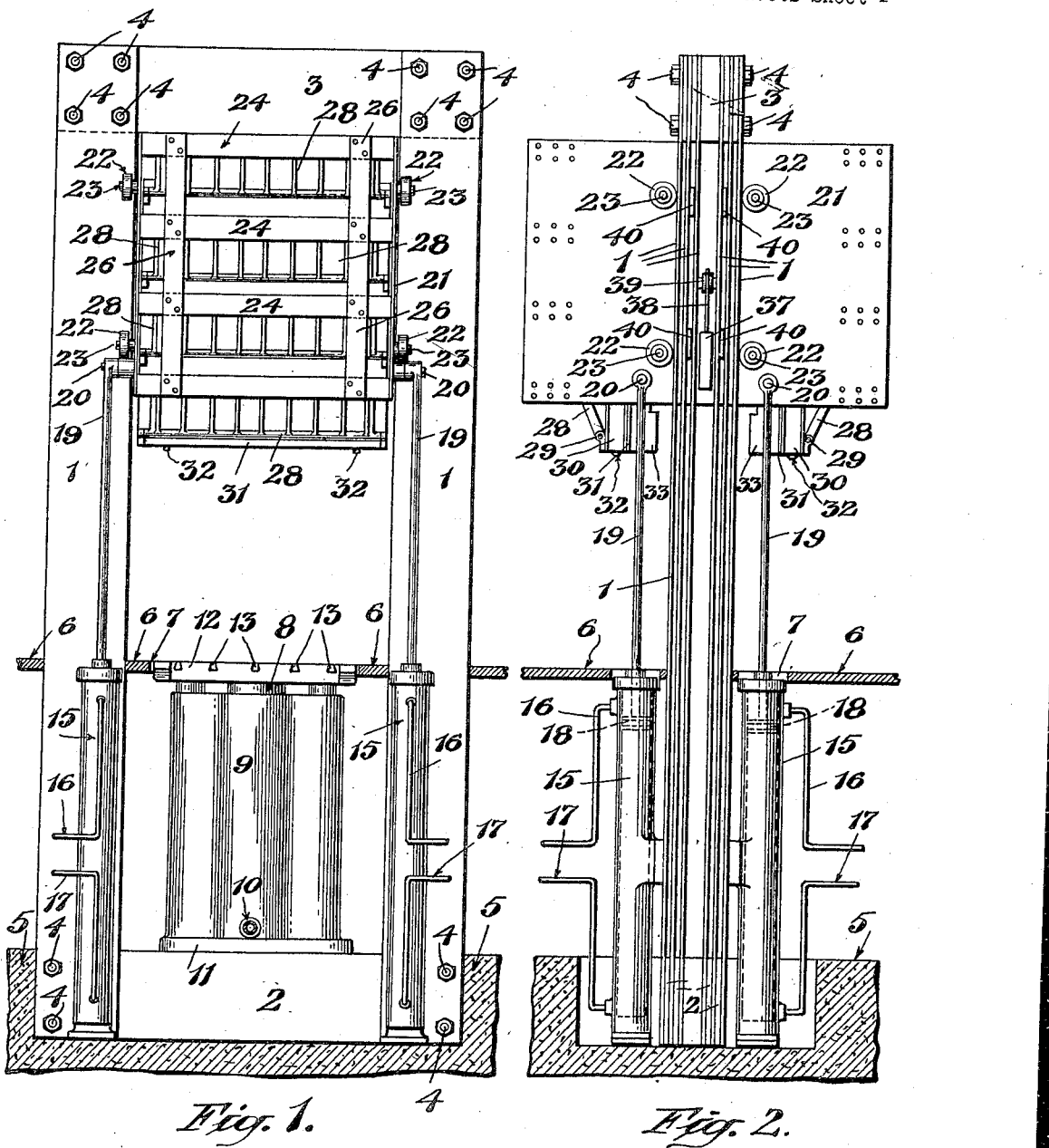
Figure 1 is a front elevation of my improved cotton bale compressing device, parts being shown in section.
Figure 2 is a side elevation of the same, parts being shown in section.
Figure 6:
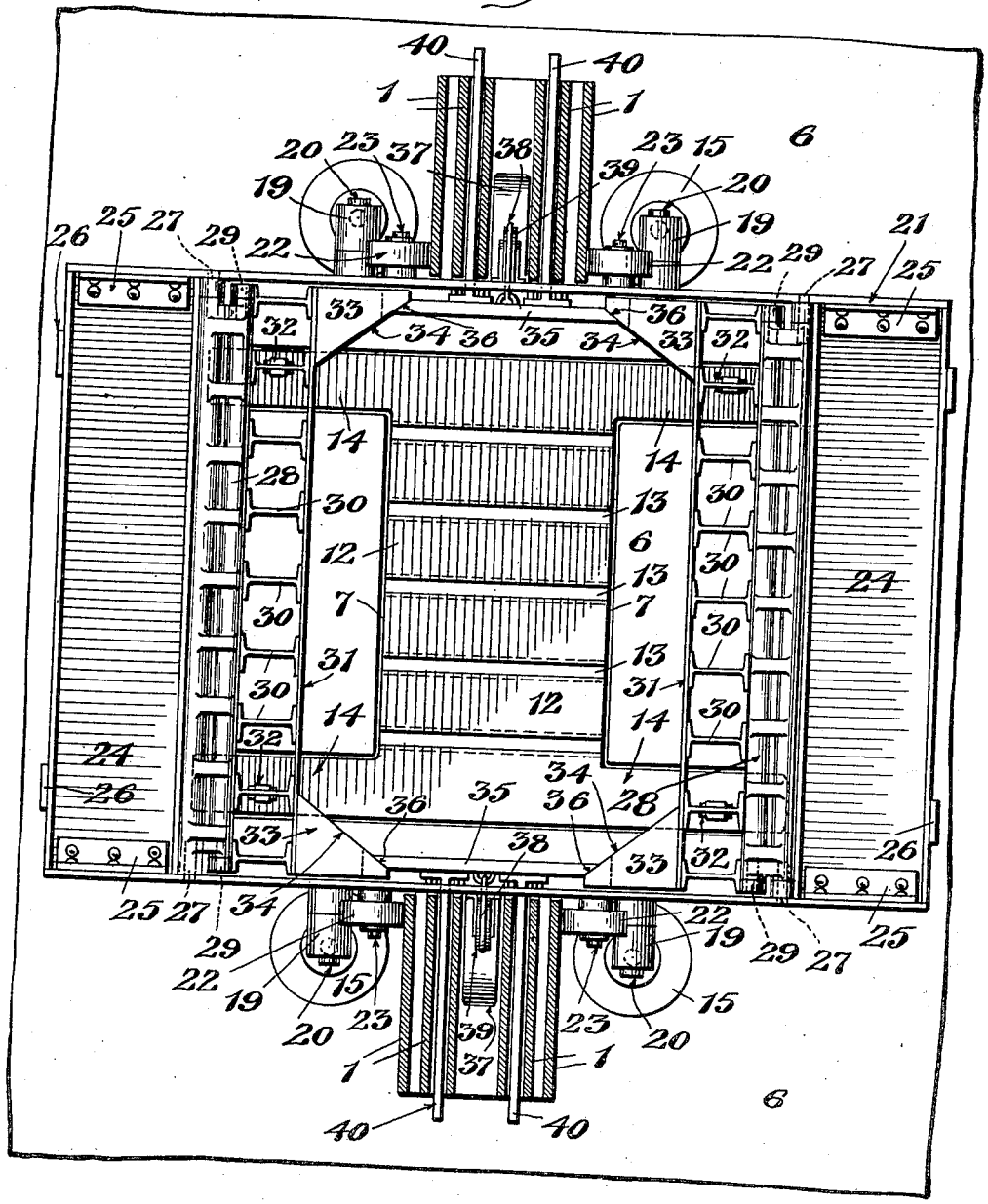
Figure 6 is a transverse sectional view of the device, showing the parts in their open position.

The machine disclosed is intended to compact cotton bales from their primary rough state to smaller compact forms, rendering them much smaller in area and consequently more convenient for storage and handling.

A feature of the construction herein disclosed resides in the fact that it simultaneously exerts pressure on four sides of a cotton bale instead of two, as has been in case with prior constructions.

In the preferred embodiment of my invention, as disclosed in the accompanying drawings, I have shown the device mounted in a suitable frame, which consists, generally, of the upright or vertical frame members 1, connected at their upper and lower ends to transverse frame members 2 and 3 by bolts 4 or the like.

The vertical frame members 1 are preferably flat strips held in spaced relationship to one another by means of the end strips 2 and 3 which extend between them. The lower end of the frame is supported in any suitable manner, and I have shown the same herein as held rigid in a concrete base 5. The upper end of the frame may be supported in a similar manner, or may be held firm and rigid by any desired form of bracing.

Located intermediate of the ends of the frame is the flooring upon which the cotton bales are handled, and this flooring is provided with an opening 7 through which a bale-elevating member or plunger 8 is raised and lowered.

The elevating plunger 8 is similar to a hydraulic ram and is suitably operated in a cylinder 9 in which hydraulic pressure is exerted, such pressure being adapted to enter said cylinder through a feed pipe 10. The cylinder 9 is provided with a base 11 which is supported upon the base 5 in any desired manner.

The bale-elevating plunger 8 is provided with a head 12 consisting of a flat plate having a plurality of grooves 13 provided in its upper surface to enable the bands or bale-tying members to be placed in position about the bale after the completion of the compressing or compacting operation. This head 12 is also provided with a plurality of lateral arms 14, which act to support the cloth covering of the rough bale and prevent the same from becoming entangled in the mechanism, when the covering is loosened in preparation for the compacting or compressing operation, and while the bale is supported upon the head 12. The head 12 is thus substantially H-shaped in outline and the opening 7 is similar in outline so that substantially no space is formed between the head and its opening 7 to permit the possibility of the cloth covering of the rough bale becoming clogged therein.

Mounted on opposite sides of the frame are a plurality of hydraulic cylinders 15, there being four of these shown, each of which is secured to the vertical frame members 1 and also supported in the base 5 in any suitable manner. Each of these cylinders is provided with a pair of feed pipes 16 and 17.

A piston 18 is movable in each of the cylinders, and connected thereto and extending vertically upward therefrom is a rod 19. There are thus four of these rods 19, and at their upper ends these rods 19 attach to pins 20 projecting from the outer faces of a pair of spaced-apart plates 21.

These plates 21 form the end members of a rigid, box-like frame which is located between the vertical frame members 1 and which is intended to be vertically reciprocated between said members, as will be hereinafter described. This frame acts as a supporting means for the side and end-compressing means of the bale as will be described. To maintain said frame in proper position and to aid in securing an easy sliding reciprocation thereof, rollers 22, mounted on pins 23, project from the plates 21 and bear against opposite faces of the vertical frame members 1 and roll against the same when the frame is reciprocated.

From the foregoing, it will be understood that when hydraulic pressure is exerted through the feed pipes 17, the pistons 18 will be forced upwardly in their respective cylinders, and they will thrust the rods 19 upwardly so that the frame connected thereto will be impelled upwardly to the position disclosed in Figures 1, 2 and 3. When, however, hydraulic pressure is exerted through the feed pipes 16, the pistons are forced downwardly in their respective cylinders, so that through the medium of the parts hereinbefore mentioned, they move the frame downwardly to the position disclosed in Figure 4, for a purpose to be hereinafter set forth.

The plates 21 of the compressing frame are connected by a plurality of spaced I-beams 24, secured at their ends to the plates 21 by means of bolted angle-irons 25. Vertical strips 26 extend on the outer ends or webs of the I-beams and connect the same together to form a rigid structure.

Secured to the end plates 21, on suitable pivot pins 27 are a number of spaced links or toggle arms 28. These arms are spaced one above the other, and as just mentioned, are pivoted at one of their ends on the pins 27, while at their other ends they are pivoted to a plurality of vertically extending I-beams 30, the end I-beams being provided with pivot pins 29 upon which the toggle arms 28 are pivoted.

At 31 are shown the side compressing plates which are secured on the outer ends of the vertical I-beams 30, and which are movable towards one another to compact the sides of the bale. The manner in which this is effected is disclosed in Figures 4 and 5.

Assuming that a bale to be compressed is placed upon the head 12 of the elevating plunger 8 and rests thereon, under the impetus of hydraulic pressure exerted through the feed pipes 16, the frame is caused to descend until it reaches the position disclosed in Figure 5. When in this position the compressing plates 31 are located on opposite sides of the bale which is resting on the support 12. The frame is provided with rollers 32 which come to rest upon the lateral portions 14 of the plunger head 12 as the downward movement of the frame continues, and a further downward movement of the frame results in a straightening out of the toggle arms 28. As these toggle arms gradually straighten out and are brought to a horizontal position, the compressing plates which are supported at their lower ends on the rollers 32 resting on the head 12, are moved towards one another and the space between them is decreased so that they compress the bale between them. While this compacting or compressing of the opposite sides of the bale is taking place, the ends of the bale are being compacted by means now to be described.

At their ends the compressing plates are provided with blocks 33 which are formed with inner inclined faces 34. These blocks 33 are fixed to the compressing plates 31 and are carried therewith and form cam blocks for the purpose of moving inwardly the end-compressing plates 35. Each of these end-compressing plates is movable between a pair of these cam blocks 34, and these plates 35 are provided with beveled or inclined edges 36 which co-incide in angle of inclination to the inclined faces 34 on the blocks 33. The end-compressing plates 35 are held with their inclined faces 36 in close contact with the inclined faces 34 on the blocks 33 by means of weights 37 connected to the plates 35 by means of cables 38 extending over pulleys 39 mounted on the frame members or plates 21. To retain the end-compressing plates in proper alignment during their movement towards one another, suitable guides 40 are provided, which guides extend through openings in the plates 21 and between the vertical members 1 of the supporting frame and are guided thereby.

From the foregoing it will be understood that when the side-compressing plates 31 move towards one another, as heretofore explained, the inclined cam blocks 33 will be likewise moved towards one another, and as such movement occurs, the inclined faces 34 on these blocks 33 will slide the end-compressing plates 35 towards one another so that the ends of the bale will be compacted by said plates 35 simultaneously with the compacting of the sides of the bale by the plates 31.

Figure 7:
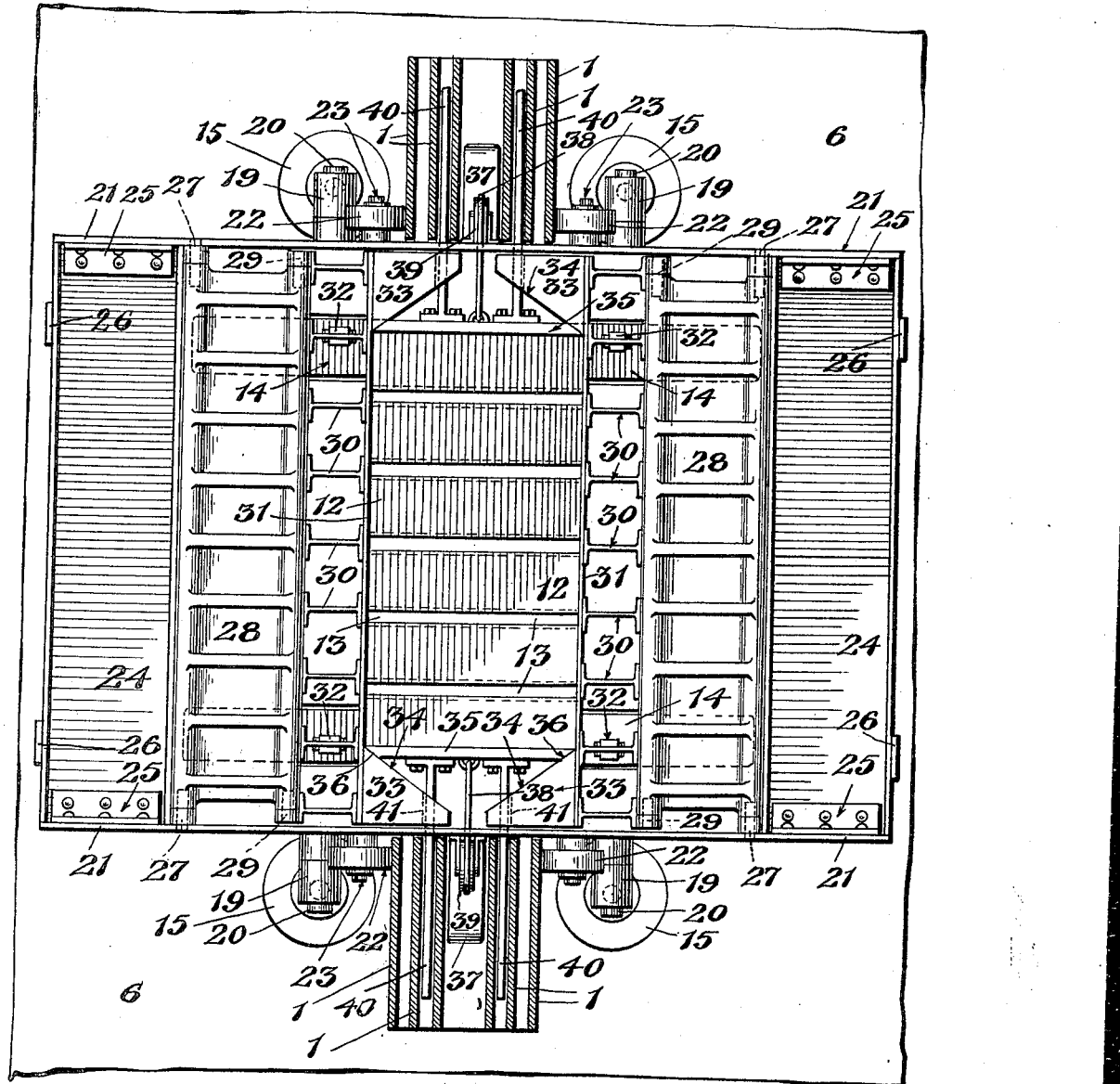
Figure 7 is a similar view, showing the parts in their closed position.

In Figure 7 the parts are shown in their closed position and it will be seen that when in this position the bale is embraced by the four plates 31 and 35 and has been compacted to the area defined by these plates when in this position. To enable the cam blocks 33 to straddle the guide members 40 as the blocks 33 are moved towards one another, these blocks are provided with recesses 41.

When the bale has been compressed on four sides through the medium of the mechanism just described, the two remaining sides are compressed. Assuming that the parts are in the position shown in Figures 4 and 7, with a bale resting upon the elevating plunger 8 and the plates 31 and 35 have been closed about the bale to compact the same on four sides. Hydraulic pressure is then exerted below the plunger 8 through the feed pipe 10 and said plunger starts upward carrying the bale. Simultaneously with this upward movement, pressure is exerted through the feed pipes 17 so that the compacting frame is also moved upward. This upward movement continues and the side of the bale which is uppermost is brought in contact with a platen 42 secured with the supporting frame and over the plunger 8. As the plunger 8 continues its upward movement it compresses the bale against the platen 42 until the required degree of compression of the bale has been reached. The entire six sides of the bale have then been compressed.

The compressing frame continues its upward movement, moving away from the plunger 8, which has at this point ceased its upward movement, and as the upward movement of the compressing frame continues, the toggle arms 28 begin to incline downwardly, increasing the distance between the compressing plates 31 and releasing pressure on the two sides of the bale embraced by these two plates. As the distance between the plates 31 is increased, the two end-compressing plates 35 separate so that pressure on four sides of the bale is released. The bands are then placed about the compacted bale. Recesses, corresponding to the recesses or grooves 13 in the plunger 8, are provided as at 50, in the platen 42 to enable the bands to be placed in position about the bale while the bale is held under pressure between the plunger 8 and the platen 42.

The plunger 8 is then permitted to descend by the release of the hydraulic pressure beneath it in the cylinder 9, and the compressed bale is carried downward to a level with the floor 6 where it is removed from the plunger. A new bale is then placed on the plunger and the cycle of operations as described herein is repeated to compress the same.

From the foregoing it is obvious that my invention is not being restricted to the exact embodiment shown, but is broad enough to cover all structures coming within the scope of the annexed claims.

Having described my invention, what I claim is:—

1. In a machine of the class described, the combination with a pair of pressing members, means for causing said members to be moved towards one another, another pair of pressing members, and means on said first-mentioned pair of pressing members for causing the second pair of members to be moved towards one another.

2. In a machine of the class described, the combination with a bale support, a pair of compressing members, said members being movable towards one another to compress the bale between them, means for causing said members to be moved towards one another, another pair of compressing members movable at right angles to the first mentioned pair, and means on the first mentioned pair of compressing members for moving the second pair of compressing members towards one another.

3. In a machine of the class described, the combination with a bale support, means for compressing a bale while held on said support, said means comprising a pair of movable plates, toggle-arms for supporting said plates, and another pair of plates movable transversely of the path of movement of the first mentioned plates and caused to be moved towards one another by movement of the first mentioned plates.

4. In a machine of the class described, the combination with a bale support, a frame adapted to surround a bale while held on said support, a pair of pressure-exerting members within said frame, toggle-arms connecting said members to said frame, another pair of plates movable between the first mentioned pair, and means on the first mentioned pair of plates for causing the second pair of plates to move towards one another when the first mentioned pair is moved towards one another.

5. In a machine of the class described, the combination with a bale support, means for compressing a bale while held on said support, said compressing means having a pair of pressure-exerting members adapted to be moved towards one another with a bale held between them, another pair of pressure-exerting members, and means on the first mentioned pair of pressure-exerting members for causing the second pair of pressure-exerting members to be moved towards one another.

6. In a machine of the class described, the combination with a frame, a bale support movably mounted within said frame, a pressure frame movable above the bale support and adapted to be moved to surround a bale held on the bale support, bale-compressing means within the pressure frame comprising a pair of pressure-exerting members adapted to embrace the opposite sides of a bale between them, another pair of pressure-exerting plates adapted to embrace the ends of a bale between them, and means on the side-pressure plates for causing the end-pressure plates to be moved towards one another.

7. In a machine of the class described, the combination with a pair of pressure-exerting members, means for moving the same, a frame, toggle-arms for connecting said pressure-exerting members to the frame, and means adapted to be held in the path of movement of the frame for causing the pressure-exerting members to be moved towards one another.

8. In a machine of the class described, the combination with a pair of pressure-exerting members, a frame, flexible connections between said members and the frame, means for reciprocating said frame, and means adapted to lie in the path of movement of the frame and contact with the pressure-exerting members to cause the same to be moved towards one another.

9. In a machine of the class described, the combination with a pair of pressure-exerting members, a frame, flexible connections between said members and the frame, means for reciprocating said frame, a bale support and means on said bale support adapted to contact with said pressure exerting members and force the same towards one another.

10. In a machine of the class described, the combination with a pair of pressure-exerting members, a frame, toggle-arms connecting said members to the frame, a bale support, means for moving the same, and means on said bale support adapted to contact with the pressure-exerting means on the downward movement of the same and while said bale support is stationary, to cause the pressure-exerting members to be forced towards one another to compact a bale held on the support between them.

11. In a machine of the class described, the combination with a bale support, a movable frame adapted to move over said support, and a pair of pressure plates in said frame adapted to be brought into contact with said support on movement of the frame towards the support and forced towards one another by such contact.

12. In a machine of the class described, the combination with bale-supporting means, a frame, a pair of pressure-exerting plates within said frame and connected thereto, means for moving said frame, means on said bale-supporting means upon which the pressure-exerting plates are adapted to be brought to rest and caused to move towards one another by downward movement of the frame.

13. In a machine of the class described, the combination with a pair of pressure-exerting members, a frame, flexible connections between said members and the frame, a bale support, means for moving the same, means for limiting movement of the pressure-exerting members, a second pair of pressure-exerting members located between the first mentioned pair, and cam means on the first mentioned pair of pressure-exerting members for moving the second pair of pressure-exerting members towards one another simultaneously with the movement of the first mentioned pair of pressure-exerting members towards one another.

14. In a machine of the class described, the combination with a pair of bale-compressing members, means for causing said members to be moved towards one another, another pair of bale-compressing members and cam means on the first mentioned pair of members for moving the second pair of members towards one another simultaneously with the movement of the first pair of members.

15. In a machine of the class described, the combination with a pair of bale-compressing members, means for moving the same towards one another to embrace a bale between them, cam surfaces on said members, a pair of bale-compressing members located between said first-mentioned pair and having faces co-operating with said cam surfaces to cause said last mentioned members to be moved towards one another simultaneously with the movement of the first mentioned members towards one another.

16. In a machine of the class described, the combination with a pair of bale-compressing members, means for reciprocating the same and means for moving the same towards one another to compress a bale between them, inclined blocks at the opposite ends of said compressing members, another pair of compressing members movable between the first mentioned pair, and faces on said last mentioned pair of members adapted to co-operate with the inclined blocks to cause the last mentioned pair of members to be forced towards one another upon movement of the first mentioned pair of compressing members towards one another.

17. In a machine of the class described, the combination with a frame, a bale support adapted to be raised and lowered therein, a pressure frame movable over said bale support, said pressure frame comprising end plates and cross members, a pair of pressure-exerting members within the pressure frame, flexible connections between said plates and the cross members of the pressure frame, a pair of pressure-exerting plates mounted to move between the first mentioned pair and at right angles to the line of movement thereof, cam faces on the first mentioned pair of pressure plates and complementary faces on the second pair of plates adapted to slide on the cam faces, means for causing the first pair of pressure plates to be moved towards one another to compress the sides of a bale between them and by such movement to cause the ends of said bale to be simultaneously compressed by movement of the other pair of pressure plates produced by the cam faces.

18. In a machine of the class described, the combination with a bale support, a pair of pressure-exerting plates adapted to be raised and lowered over said support, means for limiting the lowering movement of said pressure plates, flexible connections between said pressure plates and a frame for supporting the same, end-compressing plates movable between said first-mentioned plates, means on the first mentioned plates for moving the end-compressing plates towards one another simultaneously with movement of the first-mentioned plates towards one another, and a platen above the bale support against which the bale is adapted to be forced.

Signed at the city of Hartford, county of Hartford and State of Conn., this 9th day of Oct., 1922.

CHARLES J. LUCE.